US010643167B2

(12) United States Patent
Trenchard et al.

(10) Patent No.: US 10,643,167 B2
(45) Date of Patent: May 5, 2020

(54) MPC WITH UNCONSTRAINED DEPENDENT VARIABLES FOR KPI PERFORMANCE ANALYSIS

(71) Applicant: Honeywell International Inc., Morris Plains, NJ (US)

(72) Inventors: Andrew John Trenchard, Romsey (GB); Andrew Ogden-Swift, Hants (GB)

(73) Assignee: Honeywell International Inc., Morris Plains, NJ (US)

( * ) Notice: Subject to any disclaimer, the term of this patent is extended or adjusted under 35 U.S.C. 154(b) by 46 days.

(21) Appl. No.: 15/221,755

(22) Filed: Jul. 28, 2016

(65) Prior Publication Data
US 2018/0032940 A1 Feb. 1, 2018

(51) Int. Cl.
*G06Q 10/06* (2012.01)

(52) U.S. Cl.
CPC ..... *G06Q 10/06393* (2013.01); *G06Q 10/067* (2013.01)

(58) Field of Classification Search
None
See application file for complete search history.

(56) References Cited

U.S. PATENT DOCUMENTS

| 5,351,184 A | 9/1994 | Lu et al. |
| 5,740,033 A | 4/1998 | Wassick et al. |
| 6,207,396 B1 | 3/2001 | de Waard et al. |
| 6,666,049 B1 | 12/2003 | Katende et al. |
| 7,187,989 B2 * | 3/2007 | Attarwala ............ G05B 13/048 700/29 |

(Continued)

FOREIGN PATENT DOCUMENTS

| WO | 0020939 | 4/2000 | |
| WO | WO-2004070569 A2 * | 8/2004 | ........... G05B 13/048 |

(Continued)

OTHER PUBLICATIONS

Yoo, S. C., et al. "Optimized model predictive control of commercial btx plant using profit® controller." 2006 SICE-ICASE International Joint Conference. IEEE, 2006. (Year: 2006).*

(Continued)

*Primary Examiner* — Thomas L Mansfield
*Assistant Examiner* — Derick J Holzmacher

(57) ABSTRACT

A method of Key Performance Indicator (KPI) performance analysis and a dynamic Model Predictive Control (MPC) process model for an industrial process including measured variables (MVs) and controlled variables (CVs) for an MPC controller are provided. The MPC process model includes at least one KPI that is also included in a business KPI monitoring system for the industrial process. A future trajectory of the KPI and a steady-state (SS) value for the KPI are estimated. The future trajectory and SS value are used for determining dynamic relationships between key plant operating variables selected from the CVs and MVs, and the KPI. A performance of the KPI is analyzed including identifying at least one cause of a problem in the performance or exceeding the performance during operation of the industrial process from the dynamic relationships and a current value for at least a portion of the MVs.

13 Claims, 4 Drawing Sheets

(56) References Cited

U.S. PATENT DOCUMENTS

| | | | |
|---|---|---|---|
| 7,194,318 B2* | 3/2007 | Attarwala | G05B 13/048 700/28 |
| 7,376,472 B2 | 5/2008 | Wojsznis et al. | |
| 7,826,909 B2* | 11/2010 | Attarwala | G05B 13/048 700/45 |
| 7,930,044 B2* | 4/2011 | Attarwala | G05B 13/048 700/28 |
| 8,036,759 B2* | 10/2011 | Sheth | G05B 17/02 700/117 |
| 8,112,163 B2* | 2/2012 | Attarwala | G05B 19/4063 318/561 |
| 8,185,217 B2 | 5/2012 | Thiele | |
| 8,417,360 B2* | 4/2013 | Sustaeta | G05B 13/024 700/28 |
| 8,914,300 B2* | 12/2014 | Sustaeta | G05B 13/024 705/7.12 |
| 9,729,639 B2* | 8/2017 | Sustaeta | G05B 13/0285 |
| 2004/0049299 A1* | 3/2004 | Wojsznis | G05B 11/32 700/29 |
| 2004/0049300 A1* | 3/2004 | Thiele | G05B 11/32 700/29 |
| 2005/0075738 A1* | 4/2005 | Attarwala | G05B 13/048 700/44 |
| 2005/0137721 A1* | 6/2005 | Attarwala | G05B 13/048 700/30 |
| 2005/0149208 A1* | 7/2005 | Harmse | G05B 17/02 700/29 |
| 2006/0058899 A1* | 3/2006 | Boyden | G05B 13/026 700/44 |
| 2006/0229848 A1* | 10/2006 | Armstrong | G05B 23/0286 702/184 |
| 2006/0241907 A1* | 10/2006 | Armstrong | G05B 23/0218 702/182 |
| 2007/0276512 A1* | 11/2007 | Fan | G05B 11/32 700/37 |
| 2008/0065242 A1* | 3/2008 | Attarwala | G05B 13/048 700/44 |
| 2008/0082181 A1* | 4/2008 | Miller | G05B 23/021 700/30 |
| 2008/0140227 A1* | 6/2008 | Attarwala | G05B 13/048 700/30 |
| 2008/0244449 A1* | 10/2008 | Morrison | G05B 19/409 715/810 |
| 2009/0043546 A1* | 2/2009 | Srinivasan | G05B 13/04 703/2 |
| 2009/0204234 A1* | 8/2009 | Sustaeta | G05B 13/024 700/29 |
| 2009/0204237 A1* | 8/2009 | Sustaeta | G05B 13/0285 700/36 |
| 2009/0204245 A1* | 8/2009 | Sustaeta | G05B 13/024 700/99 |
| 2009/0204267 A1* | 8/2009 | Sustaeta | G05B 13/0285 700/291 |
| 2009/0210081 A1* | 8/2009 | Sustaeta | G05B 13/0285 700/99 |
| 2009/0216699 A1* | 8/2009 | Kelly | G06N 5/02 706/46 |
| 2009/0287319 A1* | 11/2009 | Attarwala | G05B 13/048 700/29 |
| 2010/0082396 A1* | 4/2010 | Caldwell | G06Q 10/06 705/7.16 |
| 2010/0241247 A1* | 9/2010 | Attarwala | G05B 19/4063 700/21 |
| 2010/0268353 A1* | 10/2010 | Crisalle | G05B 13/048 700/29 |
| 2011/0130850 A1 | 6/2011 | Zheng et al. | |
| 2011/0258568 A1* | 10/2011 | Pandurangan | G05B 19/409 715/771 |
| 2012/0029661 A1* | 2/2012 | Jones | G05B 19/0426 700/17 |
| 2012/0109620 A1* | 5/2012 | Gaikwad | G05B 13/048 703/21 |
| 2013/0069792 A1* | 3/2013 | Blevins | G05B 17/02 340/815.4 |
| 2013/0246316 A1* | 9/2013 | Zhao | G05B 13/048 706/11 |
| 2014/0330402 A1 | 11/2014 | Keenan et al. | |
| 2014/0344007 A1 | 11/2014 | Shende et al. | |
| 2015/0185716 A1* | 7/2015 | Wichmann | F01K 23/101 700/287 |
| 2016/0018796 A1* | 1/2016 | Lu | G05B 13/048 700/29 |
| 2016/0018797 A1* | 1/2016 | Lu | G05B 13/048 700/3 |
| 2016/0281607 A1* | 9/2016 | Asati | F02C 9/28 |
| 2016/0349740 A1* | 12/2016 | Niemiec | G05B 23/0286 |
| 2017/0359418 A1* | 12/2017 | Sustaeta | G05B 13/0285 |
| 2017/0364043 A1* | 12/2017 | Ganti | G05B 13/048 |

FOREIGN PATENT DOCUMENTS

| | | | | |
|---|---|---|---|---|
| WO | WO-2007067645 A2 * | 6/2007 | | G05B 13/022 |
| WO | WO-2009120362 A2 * | 10/2009 | | G05B 13/048 |
| WO | WO-2010088693 A1 * | 8/2010 | | G05B 17/02 |
| WO | WO-2011129981 A2 * | 10/2011 | | G05B 19/409 |
| WO | WO-2013127958 A1 * | 9/2013 | | G01K 13/00 |

OTHER PUBLICATIONS

Agarwal, Nikhil, Biao Huang, and Edgar C. Tamayo. "Assessing model prediction control (MPC) performance. 1. Probabilistic approach for constraint analysis." Industrial & engineering chemistry research 46. 24 (2007): 8101-8111. (Year: 2007).*

Wojsznis, Willy, et al. "Multi-objective optimization for model predictive control." ISA transactions 46.3 (2007): 351-361. (Year: 2007).*

Fotopoulos, Jake, "Process Control and Optimization Theory Application to Heat Treating Processes," Air Products and Chemicals, Inc., 2006, 15 pages, Pub. No. 330-06-038-US, Air Products and Chemicals, Inc., USA.

Roffel, J.J., et al., "The Design and Implementation of a Multivariable Internal Model Controller for a Continuous Polybutadiene Polymerization Train," Control of Continuous Reactors I, 1989, pp. 9-15, IFAC Dynamics and Control of Chemical Reactors (DYCORD+ 89), Maastricht, The Netherlands.

* cited by examiner

[ Controller | CV | MV | DV | My View | Configuration ]

| CV # | CV Description | Status | Value | Future Value | SS Value | Low Limit | High Limit | SetPoint |
|---|---|---|---|---|---|---|---|---|
| 1 | iC5 Inferential | GOOD | 0.0677 | 0.0680 | 0.1036 | 0.0150 | 0.3000 | |
| 2 | Condensate nC4 | GOOD | 0.0189 | 0.0189 | 0.0200 | 0.0100 | ◇0.0200 | |
| 3 | Column to Vent OP | GOOD | 0.1126 | 0.1130 | 0.1497 | 0.1000 | 0.5000 | |
| 4 | Col to Bypass OP | GOOD | 0.3126 | 0.3130 | 0.3497 | 0.2000 | 0.5000 | |
| 5 | FIC100 - OP | GOOD | 35.892 | 35.548 | 5.0000 ◇ | 5.0000 | 100.00 | |
| 6 | LIC101 - OP | GOOD | 13.138 | 13.177 | 16.485 | 5.0000 | 100.00 | |
| 7 | LIC102 - OP | GOOD | 6.3840 | 6.4833 | 15.216 | 5.0000 | 100.00 | |
| 8 | PIC100 - OP | GOOD | 14.200 | 14.230 | 16.831 | 5.0000 | 100.00 | |
| 9 | PIC101 - OP | GOOD | 37.508 | 37.465 | 33.526 | 5.0000 | 100.00 | |
| 10 | PIC103 - OP | GOOD | 0 | 1.90E-42 | 2.32E-42 | -------- | 100.00 | |
| 11 | TIC100 - OP | GOOD | 49.909 | 49.920 | 50.967 | 5.0000 | 100.00 | |

| KPI UDV # | | | | | | | | |
|---|---|---|---|---|---|---|---|---|
| 1 | Specific Energy Usage | GOOD | 278.12 | 277.15 | 27.730 | -------- | -------- | |
| 2 | Reboiler Duty - Heat Flow | GOOD | 5265631 | 5266918 | 2067890 | -------- | -------- | |
| 3 | LPG Yield | GOOD | 7.0587 | 7.0845 | 9.3303 | -------- | -------- | |
| 4 | Condensate yield | GOOD | 60.238 | 60.212 | 57.963 | -------- | -------- | |

| MV # | MV Description | Status | Value | Move | Future Value | SS Value | Low Limit | High Limit | Step Size | Mode | |
|---|---|---|---|---|---|---|---|---|---|---|---|
| 1 | FC010-SP | ON | 19.020 | 0.0558 | 19.020 | 24.000 | 15.000 | ◇24.000 | 0 | RMPC | - |
| 2 | FIC100-SP | ON | 33.546 | -0.1741 | 13.546 | 18.000 | ◇18.000 | 50.000 | 0 | RMPC | - |
| 3 | TIC100-SP | ON | 138.16 | 0.0507 | 138.16 | 142.69 | 120.00 | 200.00 | 0 | RMPC | |
| 4 | PIC100-SP | ON | 14.113 | 411E-04 | 14.113 | 14.150 | 14.000 | 14.500 | 0 | RMPC | |
| 5 | PIC101-SP | ON | 13.800 | 0 | 13.800 | 13.800 | ◇13.800 | 14.500 | 0 | RMPC | |
| 6 | PIC103-SP | ON | 14.000 | 0 | 14.000 | 14.000 | ◇14.000 | 14.500 | 0 | RMPC | |

| DV# | DV Description | Status | Value |
|---|---|---|---|
| 1 | TI110-PV | GOOD-C | 149.00 |

FIG. 4

MPC WITH UNCONSTRAINED DEPENDENT VARIABLES FOR KPI PERFORMANCE ANALYSIS

FIELD

Disclosed embodiments relate to Model Predictive Control (MPC) including Key Performance Indicators.

BACKGROUND

Processing facilities which operate physical processes that process materials, such as manufacturing plants, chemical plants and oil refineries, are typically managed using process control systems. Valves, pumps, motors, heating/cooling devices, and other industrial equipment typically perform actions needed to process the materials in the processing facilities. Among other functions, the process control systems often manage the use of the industrial equipment in the processing facilities.

In conventional process control systems, controllers are often used to control the operation of the industrial equipment in the processing facilities. The controllers can monitor the operation of the industrial equipment, provide control signals to the industrial equipment, and/or generate alarms when malfunctions are detected. Process control systems typically include one or more process controllers and input/output (I/O) devices communicatively coupled to at least one workstation and to one or more field devices, such as through analog and/or digital buses. The field devices can include sensors (e.g., temperature, pressure and flow rate sensors), as well as other passive and/or active devices. The process controllers can receive process information, such as field measurements made by the field devices, in order to implement a control routine. Control signals can then be generated and sent to the industrial equipment to control the operation of the process.

An industrial plant generally has a control room with displays for displaying process parameters such as key temperatures, pressures, fluid flow rates and flow levels, operating positions of key valves, pumps and other equipment, etc. Operators in the control room can control various aspects of the plant operation, typically including overriding automatic control. Generally in a plant operation scenario, the operator desires operating conditions such that the plant always operates at its "optimal" operating point (i.e. where the profit associated with the process is at a maximum, which can correspond to the amount of product generated) and thus close to the alarm limits. Based on changing of the feedstock composition for a chemical process, changing products requirements or economics, or other changes in constraints, the operating conditions may be changed to increase profit. However, there is an increased risk associated with operating the plant closer to the alarm limits due to variability in the process.

Advanced process controllers implement multi-variable Model Predictive Control (MPC) which is an advanced process control (APC) technique for controlling the operation of the equipment running an industrial process. The model is a set of generally linear dynamic relationships between several independent variables and several dependent variables. The model can have different forms, with Laplace transforms and ARX models being conventional model implementations. Non-linear relationships between the variables is also possible.

MPC control techniques typically involve using an empirically derived process model (i.e. based on historical process data) to analyze current input (e.g., sensor) data received, where the model identifies how the industrial equipment should be controlled (e.g., by changing actuator settings) and thus operated based on the input data received. The control principle of MPC uses three (3) types of process variables, manipulated variables MV and some measured disturbance variables (DVs) as the independent variables, and controlled variables (CVs) as the dependent variables. The model includes the response of each CV to MV/DV changes, and the model predicts future effects on the CVs from changes in the MVs and DVs.

In many industrial and commercial customer applications Key Performance Indicators (KPIs) are used by a business KPI monitoring system to track whether a business or organization is performing to acceptable standards, for example in terms of compliance with the law, production rate, energy usage, and maintaining product or service quality, and profitability. Typically there are a wide range of types of KPIs, for example from operator' working time lost due to accidents leading to injuries, maintenance shop performance, environmental emissions through to production rate, quality variations, and energy and chemicals consumption.

Some KPIs used by the business KPI monitoring system are not related to the variables that are within the scope of a MPC controller (e.g., lost time injuries and maintenance shop performance KPIs). However, KPIs relating to production goals, such as feedrate to the process, production rates of various products, product 1 vs. product yield 2, and energy consumption, etc., will typically overlap significantly with the MPC model's CVs, MVs or DVs. In some cases the same variables used to calculate KPIs are also configured as MPC model CVs or MVs (because MPC controls and optimizes the important production variables). In other cases the KPIs will be highly correlated with MPC MVs and DVs, and hence can be predicted/projected using the same MPC tools and workflows. This may include specific energy usage or product yields which can be used for performance monitoring.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize while KPIs and time-based trends of KPIs are useful for tracking performance and helping to quickly identify changes in process performance in an industrial process, further detailed analysis is often needed to understand the root causes for a change in KPI performance in order to correct, mitigate or take advantage of a change in one or more KPIs. Data science and data analytics is a growing field and there are general purpose toolsets commercially available to support practitioners in this field. However, analyzing the causes of poor KPI performance can be challenging because of the potential variety of root cause events that can impact a given KPI and visibility or inferences of those root cause events, which may be measured in disparate systems, or not measured at all. Another generally important factor is the influence of closed loop control within the system being measured, especially when the control can be switched between active (closed loop) and inactive (open loop) modes, is multivariate, i.e. has multiple inputs (CVs, DVs) and multiple outputs (MVs), which can be individually taken in or out of closed loop control, or is non-square (i.e. the number of CVs does not match the number of MVs).

It is also recognized for Model Predictive Control (MPC) there is a problem caused by the correlations between the various process variables in the MPC process model for the industrial process changing over time, depending on whether the control system is active or partially active, and whether a particular set of CV and MV are within the active set of control. Disclosed embodiments moreover recognize it is far simpler to implement KPI analytics as part of a closed loop process control application (compared to a traditional "generic" data analytics approach where statistical regression and clustering techniques are used to analyze a large set of historical time series data, but without containing a model of the process and behavior of the control layers). Although it is possible to perform KPI analytics on MPC applications for the purposes of evaluating if the MPC controller is functioning well, is configured properly and is being used effectively by the operator, the user here is the MPC maintenance engineer/MPC team leader. Moreover, tying back MPC KPI analytics back to the business KPI monitoring system is not known. Neither is the idea of including in the MPC model KPI unconstrained dependent variable (UDV) having no upper or lower control limit.

In many industrial sectors (e.g., such as the process and chemical industries) closed loop control, especially MPC control, is commonly used. The closed loop control is often configured to control and raise the profit for a plurality of CVs by adjustment of the MVs that are directly used as KPIs or generally strongly influence other KPIs. The application has some type of process model that describes the system's behavior. Modern MPC control applications are predictive, to provide early, real-time indications of the future trajectory of the CVs and MVs and whether, with the available MVs and their configured high and low limits, the MPC will be able to control the CVs with the specified CV high and low limits, or whether these limits will be violated. The control applications execute relatively fast, monitoring the real-time constraints of the control system being monitored and reconciling the CV predictions to the current process measurements. If KPI are already included in the MPC model as CVs or MVs, and/or are added as KPI UDVs, MPC can be used to predict the future trajectory of the KPIs and whether they will deviate from their targets configured in the business KPI system.

Disclosed embodiments include a method of KPI performance analysis includes providing a dynamic MPC process model for an industrial process including a plurality of MVs and a plurality of CVs for an MPC controller implemented by a processor having a memory storing the MPC process model. The MPC process model includes at least one KPI that is also included in a business KPI monitoring system for the industrial process. A future trajectory of the KPI and a steady-state (SS) value where the KPI will stabilize are estimated. The future trajectory and the SS value are used for determining dynamic relationships between key plant operating variables selected from the plurality of CVs and plurality of MVs, and the KPI. A performance of the KPI is analyzed including identifying at least one cause of a problem in the performance or exceeding the performance during operation of the industrial process from the dynamic relationships and a current value for at least a portion of the MVs.

BRIEF DESCRIPTION OF THE DRAWINGS

FIG. 4 shows an example MPC control schematic for the debutanizer process showing an example MPC control strategy employed having a plurality of KPI UDVs, according to an example embodiment.

DETAILED DESCRIPTION

Figure 1:
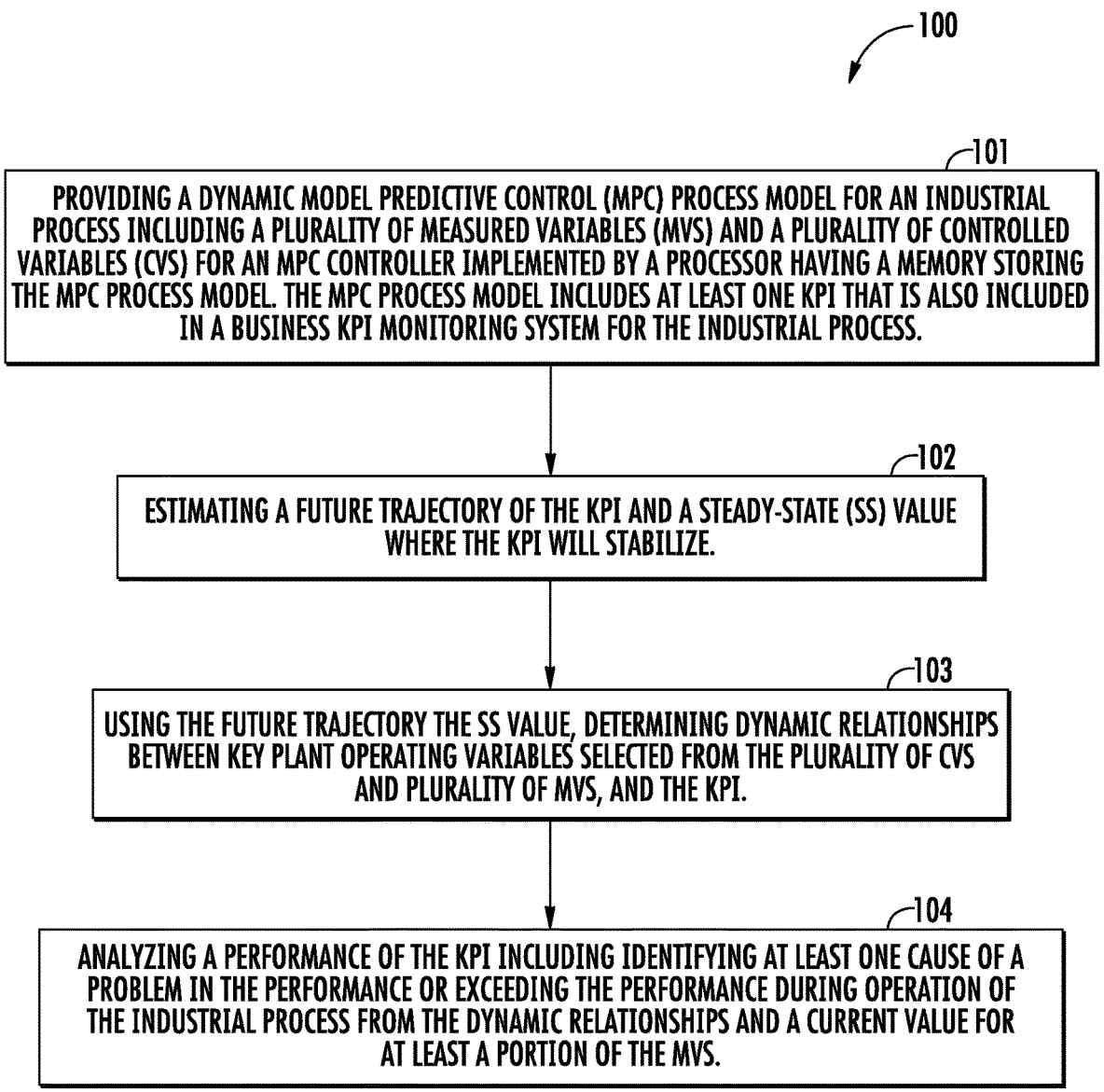
FIG. 1 is a flow chart showing steps in an example method of method of KPI performance analysis, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments implement certain types of operational KPIs with an MPC control and optimization framework enabled by alignment between the KPI management activity and MPC objectives, recognizing it is difficult to analyze the causes of poor KPI performance unless the MPC performance and configuration is taken into account. FIG. 1 is a flow chart showing steps in an example method 100 of KPI performance analysis, according to an example embodiment. Step 101 comprises providing a dynamic MPC process model for an industrial process including a plurality of MVs and a plurality of CVs for an MPC controller implemented by a processor having a memory storing the MPC process model.

The MPC process model includes at least one KPI that is also included in a business KPI monitoring system for the industrial process. The KPI can comprise a KPI UDV that as described above has no upper or lower control limit. Disturbance variables (DVs) although lacking control limits in contrast are independent variables. The MPC model can comprise a plurality of KPI UDVs. Known KPIs include feed rate and product flowrates, disclosed KPI UDVs can include key production and unit performance monitoring variables such as yields, energy and chemical consumption, and equipment efficiency. The KPIs are generally calculated externally. The calculation can be implemented in a variety of ways, such as within a MPC coded calculation or within the DCS system. The calculation can be a simple ratio of flows (e.g., a product yield) a heat balance, or more complex correlations.

The KPI is often (but not limited to) a calculated value. Feed and product flows are examples of simple directly measured KPIs. A product yield for example is a calculated value, a product flow divided by feed flow. Energy efficiency, specific energy consumption, equipment efficiency are all values that are calculated from other directly measured variables. The KPI values will generally be calculated for the business KPI monitoring system. However, the KPI values also need to be calculated for the MPC application (the values of which can then be made available to the business KPI monitoring system to avoid duplication of effort). For the MPC, there are typically two choices for the implementation of the calculations, the MPC itself or a calculation block in the distributed control system.

As known in the art, the MPC model is defined in terms of the open loop process behavior, but the MPC uses this for closed loop control by "inverting" the model. The net effect is that the process behavior is changed when the MPC is switched ON to reflect closed loop behavior.

Step 102 comprises estimating a future trajectory of the KPI and a SS value where the KPI will stabilize. Step 103 comprises using the future trajectory and the SS value to determine dynamic relationships between key plant operating variables selected from the plurality of CVs and plurality of MVs, and the KPI.

Step 104 comprises analyzing a performance of the KPI including identifying at least one cause of a problem in the performance or exceeding the performance during operation of the industrial process from the dynamic relationships and a current value for at least a portion of the MVs and optionally one or more of the CVs. The analyzing can be performed when the MPC controller is ON, is OFF or is partially ON. A significant advantage of disclosed embodiments is that the KPI analysis takes into account of the MPC state and how that (the MPC state) influences the behavior of the industrial process. The analyzing a performance of the KPI can be performed by the MPC controller or a separate computing device implementing disclosed algorithms, including a cloud based computer in one particular embodiment.

The identifying the cause of the problem can comprise identifying which of the plurality of MVs are causing changes to the KPI. The method can further comprise providing results of the analyzing to the business KPI monitoring system, and a user of the business KPI monitoring system generally on a display screen showing a dashboard view utilizes the results of the analyzing to troubleshoot the problem in the performance or in some cases reasons for exceeding the performance. The business KPI monitoring system user can suggest a change in settings for at least one MPC model parameter selected from the MVs and CVs or to initiate a query of the process operator to find out why a given KPI is currently being limited or they could trigger a workflow for another individual to investigate.

The method can further comprising updating the dynamic relationships based the analyzing of the performance. The future trajectory can be used for automatic alerting of the operator and event detection.

Most commercial MPC software includes an optimizer to direct the MPC controller to an operating point that maximizes the profit. This optimum point is found by defining an economic value or cost for one or more CVs and MVs. The optimizer calculates an ideal operating point within the high and low bounds. This optimizer essentially gives the MPC a mind of its own and can cause the MPC to drive the process towards or away from the KPI targets or tradeoff one KPI vs. another. In the case where the MPC process model includes an optimizer, the method can further comprise the identifying the cause of a problem when the optimizer is causing the KPI to deviate from its target.

The KPI may be influenced by independent variables that are not currently within the MPC scope as MVs or DVs. However, MPC configurations tools can be used search other process variables to determine if they have a measurable effect on the KPI UDVs. If this is the case, they can be added to the scope of the MPC controller so that the method can further comprise searching for at least one other variable in the industrial process that is not included in the MPC process model that impacts the KPI, and adding the other variable to the MPC process model.

The predictability of the KPI UDVs based on the MPC model can be analyzed. A good (i.e. predictable) MPC model means one can pursue further analysis. A poor model means there are other significant factors that impact the KPI UDV, which should generally be explored. If the model prediction is poor one can trigger a workflow to explore what this might be, e.g. leveraging tools for historical model identification. The quality of the KPI prediction will be based on step 102 (estimating a future trajectory) where the future KPI values are predicted. These predictions (at a future timestamp) will then be stored and later compared against the measured values (when actual time has stepped forward to the corresponding timestamp). Additional "test" models can be added to evaluate if the prediction improves. This helps to improve the understanding of the key contributors to the KPI. Examples of the factors that lead to a poor KPI prediction are the existing MPC models being out of date and needing to be updated to reflect recent changes in the process behavior, and the MPC models need to be augmented to include additional plant information. Both these effects can be overcome by a combination of commercially available plant step testing tools (e.g., The Honeywell (PROFIT STEPPER) and historic model identification tools.

If the MPC model prediction is found to be reliable from the analyzing step, the predicted KPI value is generally useful as guidance for the process operator. The MPC model and MPC constraints can then be analyzed to understand most impactive controlled/uncontrolled variables on the KPI variables, and if the KPI is being "held back" (constrained) by the over-constraining of the process (e.g. conservative MV or CV limits) and how much extra could be achieved if specific limits were relaxed, which quantifies the incremental improvement in the KPI if the associated MPC CV and MV limits were relaxed marginally.

A challenge is how to provide a good "line of sight" between the time aggregated KPIs (e.g. over one shift or day of operation) and the actions the operator takes. For example, it is possible to evaluate which individual MV and CV constraints are holding back a given KPI from its target value (e.g. by relaxing the MPC controller limits to the ideal range limits specified by the process/reliability engineers). This can be significant work to execute on every controller iteration (execution cycle~every minute) and for a KPI this generally makes more sense to do this less frequently, e.g. every Controller Time To Steady State (TTSS). One approach is to average the actual values of the MV and CV steady state values over the time period together with the limits and use these as starting points for an "optimization" case in an optimization tool such as EXCEL or The Honeywell PROFIT CONTROLLER optimization solver, relax the average limits and evaluate the impact on the KPI variables. One can also consider the effect of DVs.

Additional KPI variables not used in conventional MPC models are integrated into the MPC application as unconstrained dependent variables (UDVs) that have no upper or lower control limit so that they not controlled by the MPC. As described above, there is often good alignment between the variables included in a MPC control application (or APC in the process industries) and a number of operational related KPIs variables such as production rate, product yield, product quality and energy usage. Good alignment is provided because many of the important production variables will typically be monitored by the business KPI system and controlled and manipulated by the MPC controller. There are also other variables that are monitored by the business KPI system that are highly correlated with the MPC variables or may be correlated to combinations of the MPC variables. This is because the MPC is typically justified by improvements in the operational performance.

However, some specific KPI variables are not be included in conventional MPC because they may be considered as duplicate information or not have specific control or optimization targets. Provided that these KPI variables are influenced by at least one MV in the MPC model, it is recognized that they can be included as UDVs into the MPC model run by the MPC controller to provide several significant benefits at a generally very small additional engineering cost. Benefits include calculation of KPI projections in MPC based on the MVs, root cause analysis including identification of which MV changes are causing KPI changes, and use of KPI projections for alerting and early event detection such as when the transient deviation is too large or steady state prediction is considered a long way from its target(s).

Figure 2:
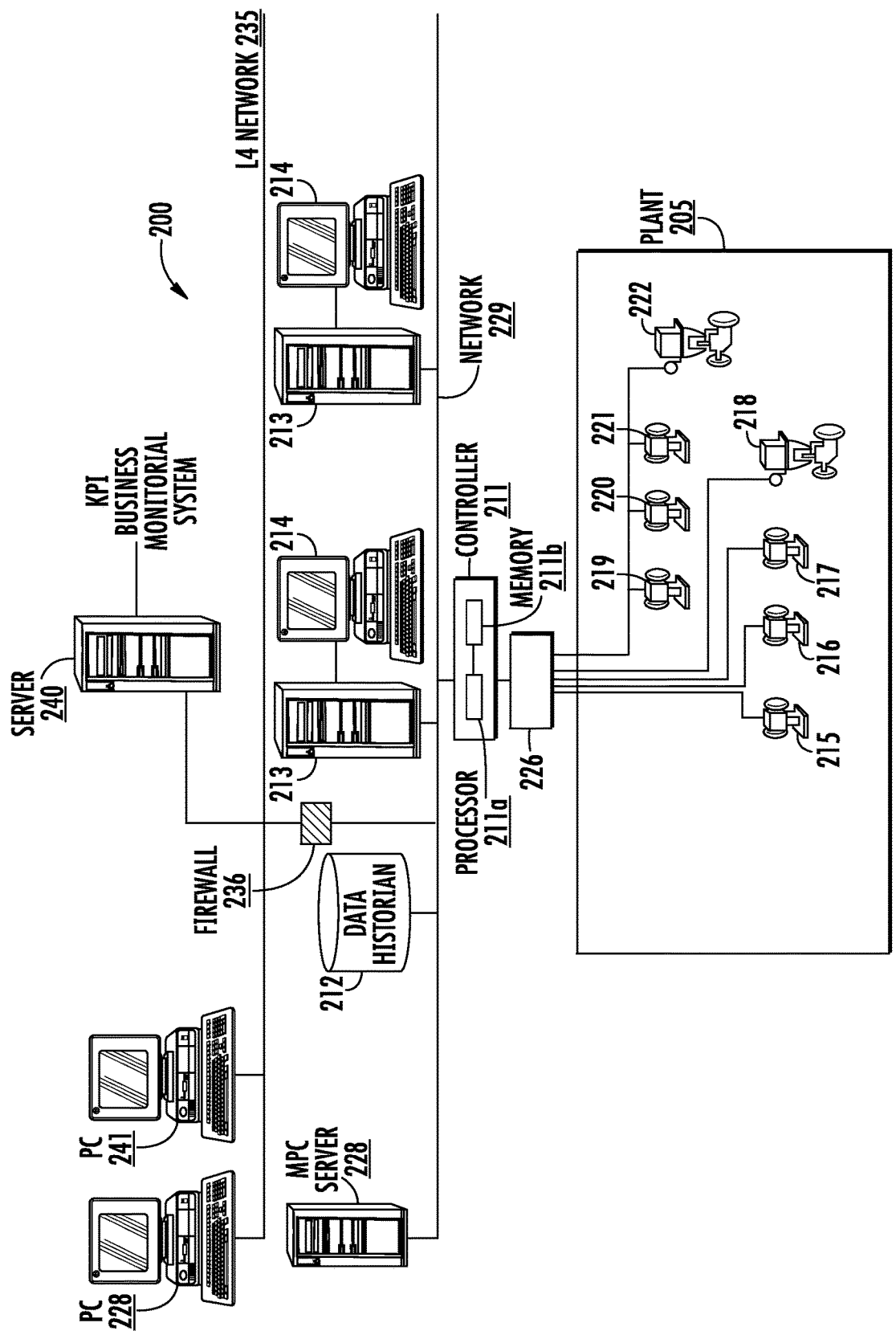
FIG. 2 is a block diagram of an example process control system including a MPI controller that implements disclosed MPC control.

Now referring now to FIG. 2, a process control system 200 is shown in which a disclosed MPC process controller 211 having KPIs including at least one KPI UDV for KPI performance analysis is communicatively connected by a network 229 to a MPC server 228, data historian 212 and to one or more host workstations or computers 213 (which may comprise personal computers (PCs), workstations, etc.), each having a display screen 214. The MPC process controller 211 includes a processor 211a and a memory 211b.

The control system 200 also includes a fourth level (L4) including a L4 network 235 having workstations or computers 241, and a KPI business monitoring system comprising a business monitoring system server 240. The business monitoring system server 240 is connected to the network 229 through a firewall 236.

The MPC controller 211 is also connected to field devices 215 to 222 via input/output (I/O) device(s) 226. The data historian 212 may generally be any type of data collection unit having a memory and software, hardware or firmware for storing data, and may be separate from or a part of one of the workstations 213. The MPC controller 211 is communicatively connected to the host computers 213 and the data historian 212 via, for example, an Ethernet connection or other communication network 229.

The communication network 229 may be in the form of a local area network (LAN), a wide area network (WAN), a telecommunications network, etc. and may be implemented using hardwired or wireless technology. The MPC controller 211 is communicatively connected to the field devices 215 to 222 using hardware and software associated with, for example, standard 4-20 ma devices and/or any smart communication protocol such as the FOUNDATION® Fieldbus protocol (Fieldbus), the HART® protocol, the Wireless HART™ protocol, etc.

The field devices 215-222 may be any types of devices, such as sensors, valves, transmitters, positioners, etc. while the I/O devices 226 may conform to generally any communication or controller protocol. The field devices 215 to 218 may be standard 4-20 ma devices or HART® devices that communicate over analog lines or combined analog/digital lines to the I/O device 226, while the field devices 219 to 222 may be 'smart' field devices, such as Fieldbus field devices, that communicate over a digital bus to the I/O device 226 using Fieldbus protocol communications.

The MPC controller 211, which may be one of many distributed controllers within the plant 205, has at least one processor therein that implements or oversees one or more process control routines, which may include control loops, stored therein or otherwise associated therewith. The MPC controller 211 also communicates with the devices 215 to 222, the host computers 213 and the data historian 212 to control a process. A process control element can be any part or portion of a process control system including, for example, a routine, a block or a module stored on any computer readable medium so as to be executable by a processor, such as a CPU of a computer device.

Control routines, which may be modules or any part of a control procedure such as a subroutine, parts of a subroutine (such as lines of code), etc. may be implemented in generally any software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. The control routines may be designed using a variety of design tools, including graphical design tools or other type of software, hardware, or firmware programming or design tools. Thus, the MPC controller 211 may be generally configured to implement a control strategy or control routine in a desired manner. In one embodiment, the MPC controller 211 implements a control strategy using what are generally referred to as function blocks, wherein each function block is a part of or an object of an overall control routine and operates in conjunction with other function blocks (via communications generally called links) to implement process control loops within the process control system 200.

Function blocks typically perform one of an input function, such as that associated with a transmitter, a sensor or other process parameter measurement device, a control function, such as that associated with a control routine that performs MPC which controls the operation of some device (e.g., a valve), to perform some physical function within the process control system 200. Function blocks may be stored in and executed by the MPC controller 211, which is typically the case when these function blocks are used for, or are associated with standard 4-20 ma devices and some types of smart field devices such as HART® devices, or may be stored in and implemented by the field devices themselves, which may be the case with FOUNDATION® Fieldbus devices. Still further, function blocks which implement controller routines may be implemented in whole or in part in the host workstations or computers 213 or in any other computer device.

EXAMPLES

Disclosed embodiments are further illustrated by the following specific Examples, which should not be construed as limiting the scope or content of this Disclosure in any way.

Figure 3:
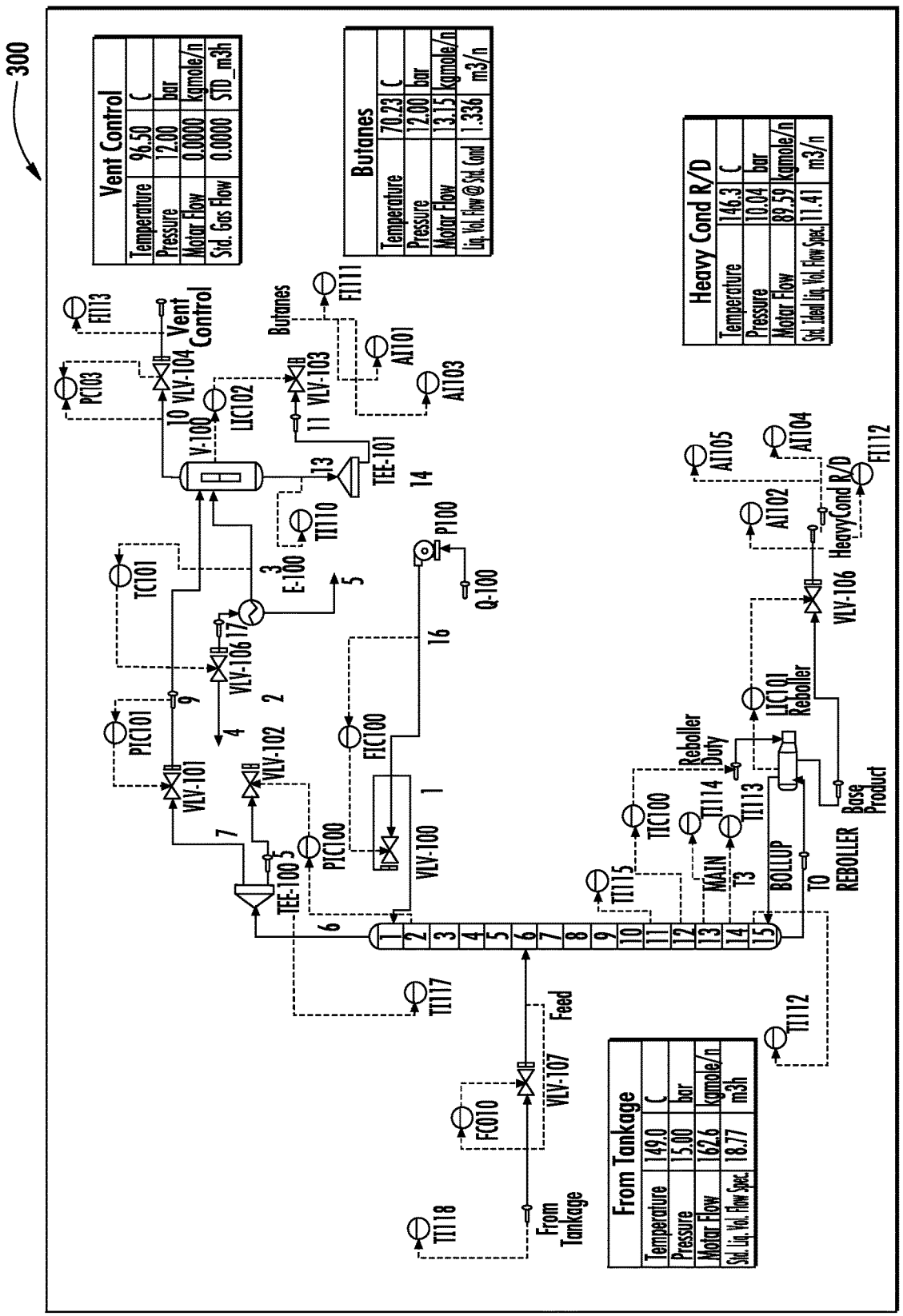
FIG. 3 is an example simulation flowsheet for a debutanizer process, according to an example embodiment.

For example, consider the simulation flowsheet 300 for a debutanizer process depicted in FIG. 3. The debutanizer process is a distillation process common in many oil refineries which separates light liquefied petroleum gas (LPG) components from a mixed naphtha stream. FIG. 4 shows an example MPC control schematic for the debutanizer process showing an example MPC control strategy employed having KPIs including several KPI UDVs.

As can be seen, many of the key distillation KPIs for the process are naturally included within the MPC model's control strategy, such as:
The unit feedrate, as manipulated variable MV1.
The overhead product quality, as control variable CV1.
The bottoms product quality, as controlled variable CV2.

However, as can be seen in FIG. 4, a number of KPI parameters not used as KPIs in conventional MPC models have been added to the MPC controller, shown as KPI UDVs 1-4 (being specific energy usage, reboiler duty-heat flow, LPG yield, and condensate yield) that each lack both a high and a low control limit. It can be seen within the MPC model that the KPI UDVs each have only steady state (SS) and future values. Implementing these KPI UDVs 1-4 as additional KPIs within the MPC model without high or low limits is recognized to provide at least two benefits:
1. MPC Controller information (such as the values of the other controller MVs, and CVs and operator entered limits, optimizer configuration (the controller state) can be used to help diagnose (find the root cause) why any of the respective KPIs are performing above or below their target (limit or range);
2. The future values of the KPIs are predicted (trajectories), so that the operator can be automatically alerted in real-time if the KPIs are predicted (future values) to change significantly in the short term to enable possible corrective action to be taken pre-emptively.

Analysing the cause(s) of poor (or exceeding) KPI performance can be implemented as a multi-step process as described below.

Step 1 Prediction Quality:

The first step can comprise the assessment of whether each KPI value is predicted well by the MPC model. The technology to analyze the prediction quality of a general MPC controlled variable is well established and has been reduced to practice in commercially available products such as Honeywell's PROFIT EXPERT toolset. This approach involves an assessment of the prediction MPC model bias relative to the movement of variables within the scope of the MPC controller and other external variables. If the MPC model is poor (a large bias for the KPI), a model update workflow using step testing tools such as Honeywell's PROFIT STEPPER and PROFIT SUITE ENGINEERING STUDIO can be used to improve the performance of the MPC model. The MPC model may be poor because it does not reflect changes in the behavior of the process or is incomplete, i.e. does not include all the influencing factors. Known tools can be used to search for influencing process variable(s) from a historical data stored in a data historian 212, that can then be refined with the step testing tools.

Step 2 Determining the Root Cause(s) of KPI Target Deviation:

There are a number sequential steps that can be followed to determine the causes of a KPI deviation from its target value or range:

Step 2a:

A check can be made to determine the percentage of time the KPI has been clamped against an operator's or engineer's entered limit and whether the MPC controller limits are consistent with the overall KPI limits. For example, in FIG. 4, 3 the feedrate (MV1) and the two quality KPIs (CV1 and CV2) have associated limits. In this real time view (a snapshot of the MPC controller at one instant in time) they are not being limited by those limits. However, over the course of the KPI aggregation period they may reach their limits for some percentage of the time.

If the KPIs within the MPC model are clamped at the MPC limits, and the MPC limits are not consistent (i.e. are more restrictive) than their KPI targets in the business KPI system, then this mismatch can be automatically flagged as a cause of poor KPI performance. For example, the poor KPI performance for the debutanizer feedrate can be reported as "Debutanizer feedrate was below target during the KPI aggregation period. 67% of this deviation can be attributed to the fact that the MPC feedrate was clamped on average at 20 m³/hr by the process operators".

Step 2b:

When the KPIs are not constrained at the limits including the KPI UDVs (that do not have limits) within the MPC controller, shown as KPI then the MPC controller performance should be examined to determine what is holding back the KPI from moving in the direction to meet the aggregated KPI target. This can be due to:
1. The MPC controller economics (Linear Program and Quadratic Program weightings) have been configured to move the KPI in the wrong direction (away from the aggregated KPI target);
2. The MPC controller economics are such that its optimizer has calculated it can make more money by moving one or more KPIs in the wrong direction, in order to move CVs and MVs (with greater economic value) towards their targets. A simple example is that when a processing plant is sold out, the incentive to produce more product (consuming more feedrate) is stronger that the incentive to reduce the total energy consumed or even the specific energy consumed. Note however, if the primary optimization handles (regarding the maximization of the production rate) hit their constraints so that the production rate cannot be increased further, the secondary objectives such as reducing any incremental specific energy consumption can come into play (i.e. reducing any incremental specific energy consumption).
3. Another, related variable within the controller is constraining the MPC controller from moving the KPI(s) in a favorable direction.

The intent of the MPC optimizer can be established in one of two ways, by comparing the steady state prediction for the KPIs (e.g., a CV or MV in the MPC) with the current measured value and by examination of the objective function economics.

The optimizer can determine which way to move the free MVs by considering the direct MV economic weightings and the impact of a change in the MVs on the CVs with economic weightings. This can be calculated analytically for a given optimizer formulation, but in the general sense this can be expressed by the following equation:

$$\text{Incentive } MV_i = \frac{\partial Obj_{cost}}{\partial MV_i}$$

Where:
$\partial$ indicates a partial derivative;
$Obj_{cost}$ is the value of a cost-based objective function:
$Obj_{cost} = \text{fn}(CV_{i,n}, MV_{j,m}, \text{Economics})$
A CV value is predicted from past MV and DV changes as shown in the equation below:

$$CV_i = fn\left(\sum_{j=1,m} g_{i,j} \times MV_j + \sum_{k=1,l} g_{i,k} \times DV_k\right)$$

If the incentive for MVi is positive, the optimizer will always seek to minimize the MVi value, subject to the MPC controller limits. If this is a KPI with an aggregated target to be maximized, then the process is relying on the process operator to always maintain the low limit at or above the aggregated KPI limit in order to achieve the aggregated KPI limit. Otherwise there will always be a mismatch between the MV and the KPI.

Likewise, if a KPI UDV will not be optimized in the right direction by any of the application MVs, then the aggregated KPI target can generally only be achieved by the correct setting of the operator limits, which can be verified from operating data. This covers case 1 described above.

Case 2 above can be determined by analyzing if there are a mixture of MVs, some of which will move a given KPI in the right direction (towards the aggregated KPI direction) and others that will move it in a wrong direction. In this scenario the optimizer can decide whether to move the KPI UDV towards or away from the aggregated KPI based on the freedom of the respective MVs to move. This case can be identified by analyzing the optimization direction, which MVs and CVs are constraints and the economic weightings.

Case 3 above can be assessed by examining the solution returned from the optimization step, in terms of the active set of constraints. Conceptually this is equivalent to sequentially relaxing the limits for the MPC variables predicted to be at their limits (at steady state) to determine if the optimizer then moves the KPI towards its aggregated KPI target.

Step 3: Aggregation and Thresholding

A number of the steps in the analysis use real time information to assess the reasons for a KPI being constrained away from its aggregated target. Generally, these reasons need to be aggregated over the KPI reporting period, ranked in terms of their percentage applicability and the top reasons reported as causes of the KPI performance problem.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of Key Performance Indicator (KPI) performance analysis, comprising:

providing a dynamic Model Predictive Control (MPC) process model to analyze input from at least sensors, valves, and transmitter in an industrial control system that controls an industrial process, said MPC process model including a plurality of measured variables (MVs) and a plurality of controlled variables (CVs) for an MPC controller implemented by a processor having a memory storing said MPC process model, said MPC process model including at least one KPI that is also included in a business KPI monitoring system for said industrial process, said at least one KPI includes at least energy efficiency, specific energy consumption, equipment efficiency, production yield, production rate, and product quality;

estimating a future trajectory of said KPI and a steady-state (SS) value where said KPI will stabilize;

using said future trajectory and said SS value, determining dynamic relationships between key plant operating variables from said plurality of CVs and said plurality of MVs, and said KPI, analyzing a performance of said KPI including identifying at least one cause of a problem in said performance or exceeding said performance during operation of said industrial process from said dynamic relationships and a current value for at least a portion of said MVs; and showing, on a display screen, a dashboard view based on the results of the analyzing to troubleshoot said problem in the performance, wherein said MPC process model includes an optimizer to determine said dynamic relationships, configured to:

flag a mismatch when said KPI within the MPC process model is clamped at the MPC limits, and the MPC limits are not consistent with the KPI targets of the business KPI system;

examine the performance of said KPI to determine what is holding back said KPI from moving in the direction to meet the KPI targets of the business KPI system, when said KPI is constrained at the limits within the MPC controller;

calculate an ideal operating point within high and low bounds to direct said MPC controller to said operating point that maximizes a profit by defining an economic value or cost for at least one of CVs and MVs; and identify using said mismatch of said performance, the cause of said problem identifying when said optimizer is causing said KPI to deviate from its target, to automatically alert an operator in real-time (when) said KPI is predicted to change significantly in the short term to enable the operator to apply corrective actions in the industrial control system.

2. The method of claim 1, wherein said KPI comprises a KPI unconstrained dependent variable (UDV) having no upper or lower control limit.

3. The method of claim 2, wherein said KPI comprises a plurality of said KPI UDVs.

4. The method of claim 1, wherein said identifying said cause of said problem comprises identifying which of said plurality of MVs are causing changes to said KPI.

5. The method of claim 1, further comprising providing results of said analyzing to said business KPI monitoring system based on suggestion of a user to change in settings in parameter of said MPC process model.

6. The method of claim 1, further comprising updating said dynamic relationships based on said analyzing said performance.

7. The method of claim 1, further comprising using said future trajectory for automatic alerting and event detection.

8. The method of claim 1, further comprising searching, by a MPC configurations tool, for variables correspond to said KPI in said industrial process that is not included in said MPC process model that impacts said KPI, and then adding said variables to said MPC process model.

9. A Model Predictive Control (MPC) controller, comprising:

a processor having a memory storing at least one algorithm executed by said processor for implementing a dynamic MPC process model to analyze input from at least sensors, valves, and transmitters in an industrial control system that controls an industrial process run in an industrial plant, said MPC process model including a plurality of measured variables (MVs) and a plurality of controlled variables (CVs), said MPC process model including at least one KPI that is also included in a business KPI monitoring system for said industrial process, wherein said KPI comprises a KPI unconstrained dependent variable (UDV) having no upper or lower control limit, said at least one KPI further includes at least energy efficiency, specific energy consumption, equipment efficiency, production yield, production rate, and product quality;

said MPC process model:

estimating a future trajectory of said KPI and a steady-state (SS) value where said KPI will stabilize, using said future trajectory and said SS value, determining dynamic relationships between key plant operating variables from said plurality of CVs and said plurality of MVs, and said KPI; and showing, on a display screen, a dashboard view based on the results of the analyzing to troubleshoot a problem in a performance, wherein said MPC controller includes an optimizer to determine said dynamic relationships, configured to:

flag a mismatch when said KPI within the MPC process model is clamped at the MPC limits, and the MPC limits are not consistent with the KPI targets of the business KPI system;

examine said performance of said KPI to determine what is holding back said KPI from moving in the direction to meet the KPI targets of the business KPI system, when said KPI is constrained at the limits within the MPC controller;

calculate an ideal operating point within high and low bounds to direct said MPC controller to said operating point that maximizes a profit by defining an economic value or cost for at least one of CVs and MVs; and identify using said mismatch of said performance, the cause of said problem identifying when said optimizer is causing said KPI to deviate from its target, to automatically alert an operator in real-time when said KPI is predicted to change significantly in the short term to enable the operator to apply corrective actions in the industrial control system.

10. The MPC controller of claim 9, wherein said MPC process model further provides analyzing said performance of said KPI including identifying at least one cause of said problem in said performance or exceeding said performance during operation of said industrial process from said dynamic relationships and a current value for at least a portion of said MVs.

11. The MPC controller of claim 9, wherein said KPI comprises a plurality of said KPI UDVs.

12. The MPC controller of claim 9, wherein said MPC process model further provides using said future trajectory for automatic alerting and event detection.

13. A Model Predictive Control (MPC) controller to enable possible corrective action in the industrial control system, comprising:

a processor having a memory storing at least one algorithm executed by said processor for implementing a dynamic MPC process model to analyze input from at least sensors, valves, and transmitters in an industrial control system that controls an industrial process run in an industrial plant, said MPC process model including a plurality of measured variables (MVs) and a plurality of controlled variables (CVs), said MPC process model including at least one KPI that is also included in a business KPI monitoring system for said industrial process, wherein said KPI comprises a KPI unconstrained dependent variable (UDV) having no upper or lower control limit, said at least one KPI includes at least energy efficiency, specific energy consumption, equipment efficiency, production yield, production rate, and product quality;

said MPC process model:

estimating a future trajectory of said KPI and a steady-state (SS) value where said KPI will stabilize;

using said future trajectory and said SS value, determining dynamic relationships between key plant operating variables from said plurality of CVs and said plurality of MVs, and said KPI;

analyzing a performance of said KPI including identifying at least one cause of a problem in said performance or exceeding said performance during operation of said industrial process from said dynamic relationships and a current value for at least a portion of said MVs; and showing, on a display screen, a dashboard view based on the results of the analyzing to troubleshoot said problem in the performance, wherein said MPC controller includes an optimizer to determine said dynamic relationships, configured to:

flag a mismatch when said KPI within the MPC process model is clamped at the MPC limits, and the MPC limits are not consistent with the KPI targets of the business KPI system;

examine the performance of said KPI to determine what is holding back said KPI from moving in the direction to meet the KPI targets of the business KPI system, when said KPI is constrained at the limits within the MPC controller;

calculate an ideal operating point within high and low bounds to direct said MPC controller to said operating point that maximizes a profit by defining an economic value or cost for at least one of CVs and MVs; and identify using said mismatch of said performance, the cause of said problem identifying when said optimizer is causing said KPI to deviate from its target, to automatically alert an operator in real-time when said KPI is predicted to change significantly in the short term to enable the operator to apply possible corrective actions in the industrial control system.

* * * * *